(12) United States Patent
Nishio et al.

(10) Patent No.: US 8,111,958 B2
(45) Date of Patent: Feb. 7, 2012

(54) OPTICAL WAVEGUIDE WITH PHOTOELECTRIC CONVERSION ELEMENT AND OPTICAL TOUCH PANEL

(75) Inventors: Hajime Nishio, Ibaraki (JP); Noriyuki Juni, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 149 days.

(21) Appl. No.: 12/724,054

(22) Filed: Mar. 15, 2010

(65) Prior Publication Data
US 2010/0259508 A1    Oct. 14, 2010

(30) Foreign Application Priority Data
Apr. 9, 2009    (JP) ................................. 2009-094499

(51) Int. Cl.
G02B 6/12    (2006.01)
G06F 3/046    (2006.01)

(52) U.S. Cl. ............. 385/33; 385/32; 385/130; 345/176

(58) Field of Classification Search ................... 345/176
See application file for complete search history.

(56) References Cited

U.S. PATENT DOCUMENTS

| 7,474,816 | B2 * | 1/2009 | Payne ............................. 385/14 |
| 7,477,816 | B2 * | 1/2009 | Juni ................................ 385/33 |
| 7,941,017 | B2 * | 5/2011 | Juni ................................ 385/33 |
| 2005/0175306 | A1 * | 8/2005 | Chong et al. ................... 385/129 |
| 2007/0154133 | A1 * | 7/2007 | Graham .......................... 385/14 |
| 2008/0106527 | A1 * | 5/2008 | Cornish et al. ................ 345/176 |
| 2008/0198144 | A1 | 8/2008 | Shimizu et al. |
| 2008/0252620 | A1 * | 10/2008 | Shimizu ....................... 345/176 |

FOREIGN PATENT DOCUMENTS
JP    2008-203431 A    9/2008
* cited by examiner

*Primary Examiner* — Jerry Rahll
(74) *Attorney, Agent, or Firm* — Westerman, Hattori, Daniels & Adrian, LLP (57) ABSTRACT

An optical waveguide with photoelectric conversion element includes an under-cladding layer and an over-cladding layer including a thick portion having a large thickness and a thin portion having a small thickness. The optical waveguide with photoelectric conversion element is bendable in a region including the thin portion in such a direction that the under-cladding layer faces inward. This makes it possible to arrange a photoelectric conversion element of each of the optical waveguides with photoelectric conversion element and its associated circuit on the back side of a display panel of an optical touch panel, thereby reducing the size of a frame surrounding a coordinate input region of the optical touch panel and the difference in level on the surface of the frame and its vicinity.

17 Claims, 7 Drawing Sheets

PRIOR ART

OPTICAL WAVEGUIDE WITH PHOTOELECTRIC CONVERSION ELEMENT AND OPTICAL TOUCH PANEL

BACKGROUND OF THE INVENTION

1. Field of the Invention

The present invention relates to an optical waveguide with photoelectric conversion element suitable for use in optical touch panels and an optical touch panel.

2. Description of Related Art

Figure 5:
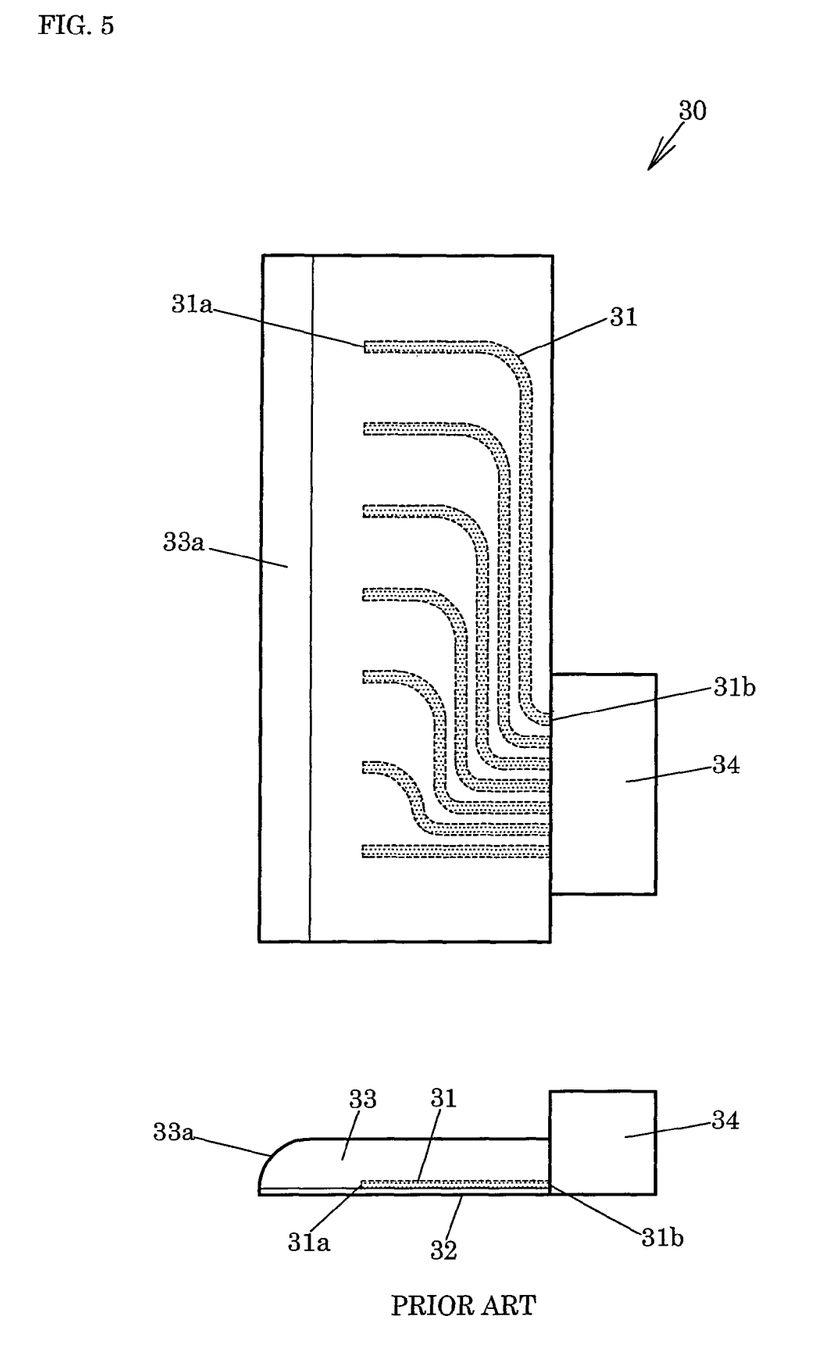
FIG. 5 is a schematic view of a conventional optical waveguide with photoelectric conversion element.

FIG. 5 shows an optical waveguide 30 with photoelectric conversion element as an example of a conventional optical waveguide with photoelectric conversion element (see, for example, JP 2008-203431 A). The conventional optical waveguide 30 with photoelectric conversion element includes a plurality of cores 31 through which light propagates, an under-cladding layer 32 supporting the cores 31, an over-cladding layer 33 embedding the cores 31, and a photoelectric conversion element 34. The over-cladding layer 33 is equipped with a convex lens portion 33a whose cross-sectional shape is substantially a quarter of a circle.

Figure 6:
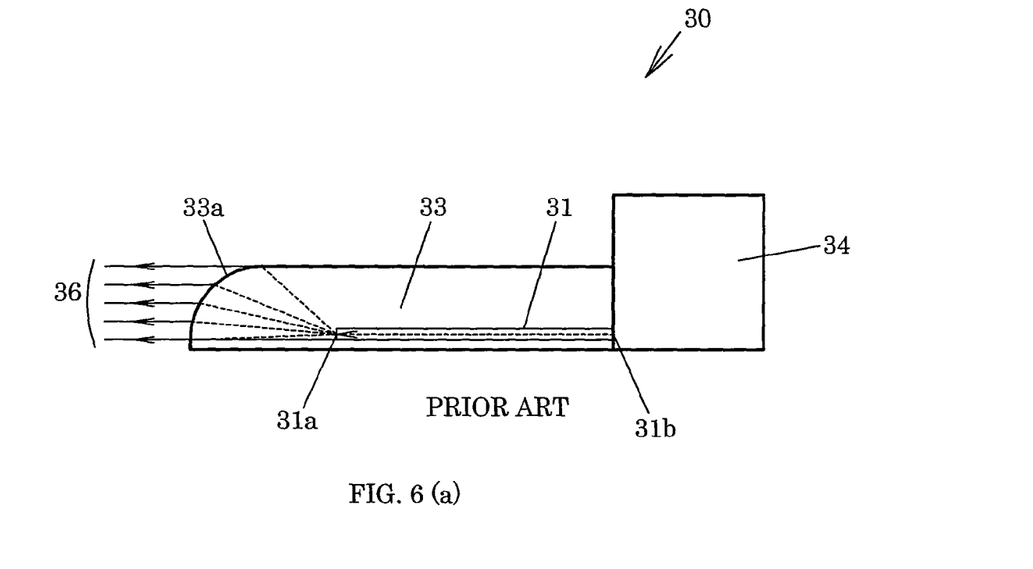

FIG. 6 (a) is a schematic view of the conventional optical waveguide 30 with photoelectric conversion element when used as a light emitting-side optical waveguide. In this case, a light emitting element which converts electrical signals into optical signals is used as the photoelectric conversion element 34. Each of the cores 31 has an end 31a and the other end 31b, and the other end 31b of each of the cores 31 is optically coupled to a light emitting port of the photoelectric conversion element 34. Light (indicated by a dotted line) emitted from the photoelectric conversion element 34 enters the cores 31, propagates through the cores 31, emerges from the ends 31a of the cores 31, and enters the over-cladding layer 33. The diverging light emerging from the ends 31a of the cores 31 is collimated by the convex lens portion 33a and outputted as parallel light 36.

FIG. 6 (b) is a schematic view of the conventional optical waveguide 30 with photoelectric conversion element when used as a light receiving-side optical waveguide. In this case, a light receiving element which converts optical signals into electrical signals is used as the photoelectric conversion element 34. Wide parallel light 37 received by the surface of the convex lens portion 33a of the optical waveguide 30 with photoelectric conversion element is concentrated by the convex lens portion 33a onto the ends 31a of the cores 31 in the over-cladding layer 33, enters the cores 31, propagates through the cores 31, enters the photoelectric conversion element 34 optically coupled to the ends 31b of the cores 31, and is then converted into electrical signals. Here, the term "optically coupled" means that the photoelectric conversion element 34 and the ends 31b of the cores 31 are coupled to each other so that light can efficiently transmit from the photoelectric conversion element 34 to the cores 31 or from the cores 31 to the photoelectric conversion element 34.

Figure 7:
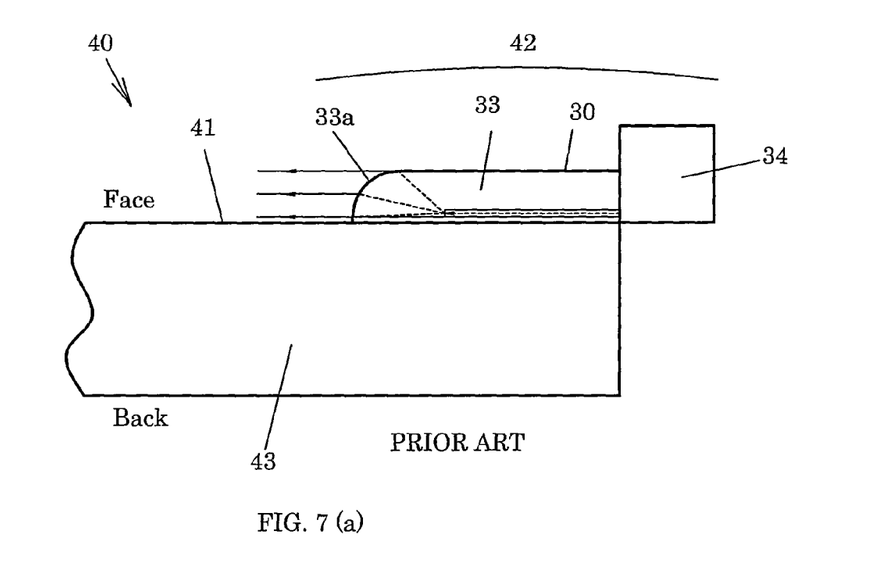

Such an optical waveguide 30 with photoelectric conversion element is suitable for use in optical touch panels. FIG. 7 (a) is a schematic view of the conventional optical waveguide 30 with photoelectric conversion element when used as a light emitting-side optical waveguide in an optical touch panel 40. FIG. 7 (b) is a schematic view of the conventional optical waveguide 30 with photoelectric conversion element when used as a light receiving-side optical waveguide in the optical touch panel 40. As shown in FIGS. 7 (a) and 7 (b), in the optical touch panel 40 using the conventional optical waveguides 30 with photoelectric conversion element, the photoelectric conversion element 34 of each of the optical waveguides 30 with photoelectric conversion element and its associated circuit (not shown) are arranged on the face side of a display panel 43. This makes it difficult to reduce the size of a frame 42 of the optical touch panel 40 and the difference in level on the surface of the frame 42 and its vicinity. It is to be noted that the surface of the display panel 43 serves as a coordinate input region 41.

As described above, in the optical touch panel 40 using the conventional optical waveguides 30 with photoelectric conversion element, the photoelectric conversion element 34 of each of the optical waveguides 30 with photoelectric conversion element and its associated circuit are arranged on the face side of the display panel 43. This makes it difficult to reduce the size of the frame 42 of the optical touch panel 40 and the difference in level on the surface of the frame 42 and its vicinity.

SUMMARY OF THE INVENTION

It is therefore an object of the present invention to provide an optical waveguide with a photoelectric conversion element suitable for use in an optical touch panel to reduce the size of a frame surrounding a coordinate input region of the optical touch panel and the difference in level on the surface of the frame and its vicinity. Further, it is another object of the present invention to provide an optical touch panel using such an optical waveguide with photoelectric conversion element.

The optical waveguide with photoelectric conversion element according to the present invention includes an under-cladding layer and an over-cladding layer including a thick portion having a large thickness and a thin portion having a small thickness. The optical waveguide with photoelectric conversion element according to the present invention performs emission or reception of light in the thick portion. Further, the optical waveguide with photoelectric conversion element according to the present invention is bendable in a region including the thin portion in such a direction that the under-cladding layer faces inward. This makes it possible to arrange a photoelectric conversion element of the optical waveguide with photoelectric conversion element according to the present invention and its associated circuit on the back side of a display panel of an optical touch panel, thereby reducing the size of a frame surrounding a coordinate input region of the optical touch panel and the difference in level on the surface of the frame and its vicinity.

Summary of the present invention is as follows.

In a first preferred embodiment, an optical waveguide with photoelectric conversion element according to the present invention is an optical waveguide with photoelectric conversion element including an optical waveguide having a plurality of cores through which light propagates, an under-cladding layer supporting the cores, and an over-cladding layer embedding the cores; and a photoelectric conversion element optically coupled to the optical waveguide. The over-cladding layer includes a thick portion and a thin portion. Each of the cores includes a total reflecting mirror provided at its end. The optical waveguide is bendable in a region including the thin portion in such a direction that the under-cladding layer faces inward. The photoelectric conversion element is arranged on the thin portion so as to be optically coupled to the cores via the total reflecting mirrors.

In a second preferred embodiment of the optical waveguide with photoelectric conversion element according to the present invention, the optical waveguide has a thickness of 50 to 200 µm in a region including the thin portion.

In a third preferred embodiment of the optical waveguide with photoelectric conversion element according to the present invention, the under-cladding layer and the over-cladding layer are formed from a UV curable epoxy-based resin.

In a fourth preferred embodiment of the optical waveguide with photoelectric conversion element according to the present invention, the over-cladding layer further includes a convex lens portion whose cross-sectional shape is substantially a quarter of a circle as a light emitting portion or a light receiving portion.

In a fifth preferred embodiment of the optical waveguide with photoelectric conversion element according to the present invention, the core has a higher refractive index than the under-cladding layer and the over-cladding layer. A difference in refractive index between the core and the under-cladding layer and between the core and the over-cladding layer is 0.02 to 0.2.

In a sixth preferred embodiment, an optical touch panel according to the present invention is a touch panel equipped with the optical waveguide with photoelectric conversion element, wherein a photoelectric conversion element is arranged on the back side of a display panel.

ADVANTAGE OF THE INVENTION

The use of the optical waveguide with photoelectric conversion element according to the present invention in an optical touch panel makes it possible to reduce the size of a frame surrounding a coordinate input region of the optical touch panel and the difference in level on the surface of the frame and its vicinity.

For a full understanding of the present invention, reference should now be made to the following detailed description of the preferred embodiments of the invention as illustrated in the accompanying drawings.

BRIEF DESCRIPTION OF THE DRAWINGS

FIG. 2 (a) is a schematic view of the optical waveguide with photoelectric conversion element according to the present invention when used as a light emitting-side optical waveguide;

FIG. 2 (b) is a schematic view of the optical waveguide with photoelectric conversion element according to the present invention when used as a light receiving-side optical waveguide;

FIG. 3 (a) is a schematic view of the optical waveguide with photoelectric conversion element according to the present invention when used as a light emitting-side optical waveguide in an optical touch panel;

FIG. 3 (b) is a schematic view of the optical waveguide with photoelectric conversion element according to the present invention when used as a light receiving-side optical waveguide in the optical touch panel;

FIG. 6 (a) is a schematic view of the conventional optical waveguide with photoelectric conversion element when used as a light emitting-side optical waveguide;

FIG. 6 (b) is a schematic view of the conventional optical waveguide with photoelectric conversion element when used as a light receiving-side optical waveguide;

FIG. 7 (a) is a schematic view of the conventional optical waveguide with photoelectric conversion element when used as a light emitting-side optical waveguide in an optical touch panel; and FIG. 7 (b) is a schematic view of the conventional optical waveguide with photoelectric conversion element when used as a light receiving-side optical waveguide in the optical touch panel.

DESCRIPTION OF THE PREFERRED EMBODIMENTS

The preferred embodiments of the present invention will now be described with reference to FIGS. 1-7 of the drawings. Identical elements in the various figures are designated with the same reference numerals.

<Optical Waveguide with Photoelectric Conversion Element>

Figure 1:
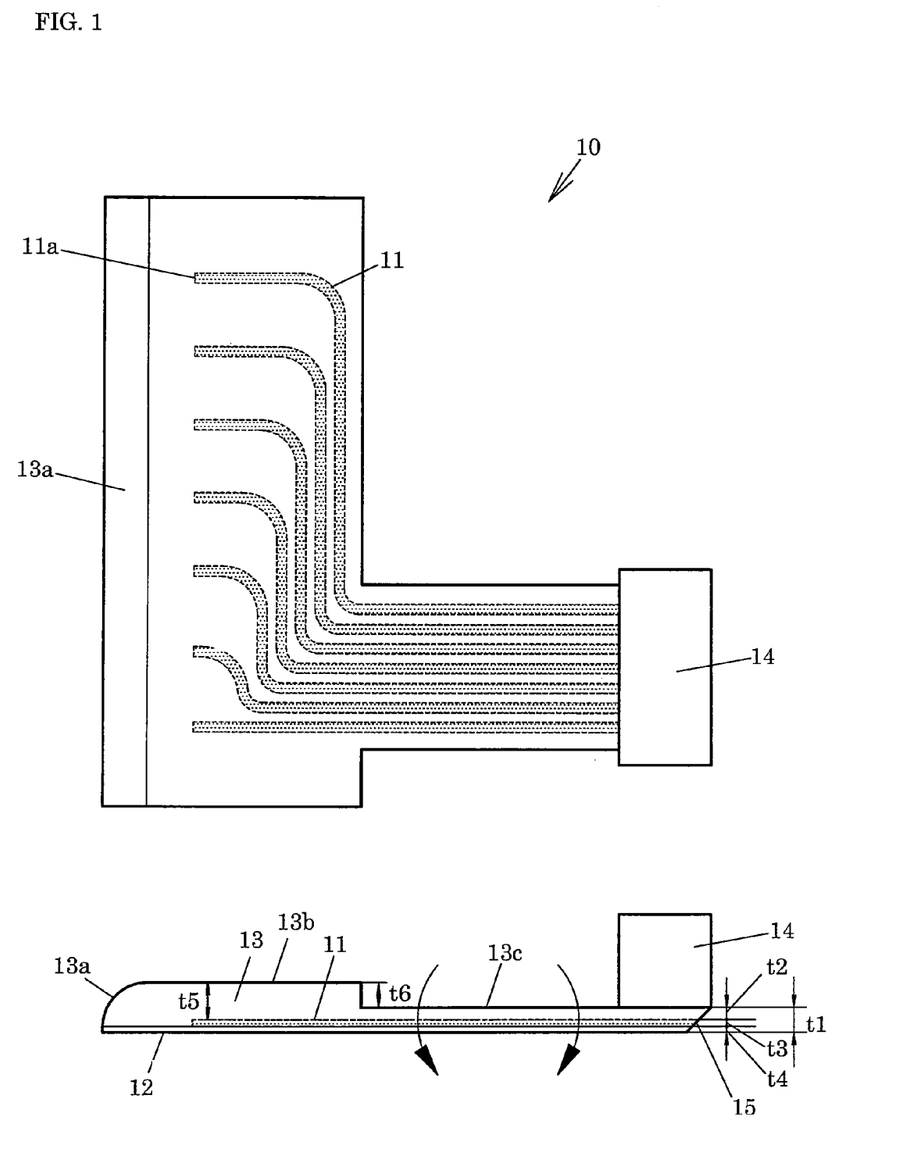
FIG. 1 is a schematic view of an optical waveguide with photoelectric conversion element according to the present invention.

FIG. 1 shows an optical waveguide 10 with photoelectric conversion element according to one embodiment of the present invention. The optical waveguide 10 with photoelectric conversion element according to the present invention includes a plurality of cores 11 through which light propagates, an under-cladding layer 12 supporting the cores 11, an over-cladding layer 13 embedding the cores 11, and a photoelectric conversion element 14. The over-cladding layer 13 is equipped with a convex lens portion 13a whose cross-sectional shape is substantially a quarter of a circle.

The optical waveguide 10 with photoelectric conversion element according to one embodiment of the present invention shown in FIG. 1 emits or receives light through an end 11a of each of the cores 11 arranged in parallel.

The over-cladding layer 13 of the optical waveguide 10 with photoelectric conversion element according to the present invention includes a thick portion 13b having a large thickness and a thin portion 13c having a small thickness. Emission or reception of light is performed at the convex lens portion 13a provided at the end of the thick portion 13b. The thin portion 13c has low rigidity, and is therefore bendable in a direction indicated by arrows in FIG. 1, that is, in such a direction that the under-cladding layer 12 faces inward. The thickness of the optical waveguide 10 with photoelectric conversion element according to the present invention in a region including the thin portion 13c, that is, the total thickness t1 of the thickness t4 of the under-cladding layer 12, the thickness t3 of the core 11, and the thickness t2 of the thin portion 13c of the over-cladding layer 13 is preferably in the range of 50 to 200 μm to reduce rigidity. If the over-cladding layer 13 has a uniform thickness equal to the thickness t2 of the thin portion 13c, the convex lens portion 13a is too thin and therefore there is a fear that the convex lens portion 13a cannot satisfactorily perform its function of collimating light emerging from the ends 11a of the cores 11 (which will be described later) or concentrating incident light onto the ends 11a of the cores 11 (which will be described later). Further, if the over-cladding layer 13 of the optical waveguide 10 with photoelectric conversion element used in an optical touch panel has such a uniform thickness equal to the thickness t2 of the thin portion 13c, light crossing a coordinate input region is extremely close to a display panel, which becomes the cause of a malfunction caused by dust or the like on the screen of the display panel. For these reasons, the over-cladding layer 13 needs to have the thick portion 13b having a large thickness.

In the optical waveguide 10 with photoelectric conversion element according to the present invention, each of the cores 11 further includes a total reflecting mirror 15 at the other end thereof. The total reflecting mirror 15 is formed by cutting the other end of each of the cores 11 at an angle at which total reflection of light occurs and mirror-finishing a cutting surface. The total reflecting mirror 15 is located directly below a light-emitting portion or light-receiving portion of the photoelectric conversion element 14. The total reflecting mirror 15 is typified by a 45-degree mirror whose cutting surface forms an angle of 45° with respect to the direction of light propagating through the core 11. The thickness t2 of the over-cladding layer 13 in a region where the total reflecting mirrors 15 are provided is preferably small. If the thickness t2 of the over-cladding layer 13 in a region where the total reflecting mirrors 15 are provided is large, there is a fear that light is likely to scatter and attenuate in the over-cladding layer 13 interposed between the photoelectric conversion element 14 and the cores 11, thereby reducing optical coupling efficiency.

Figure 2:
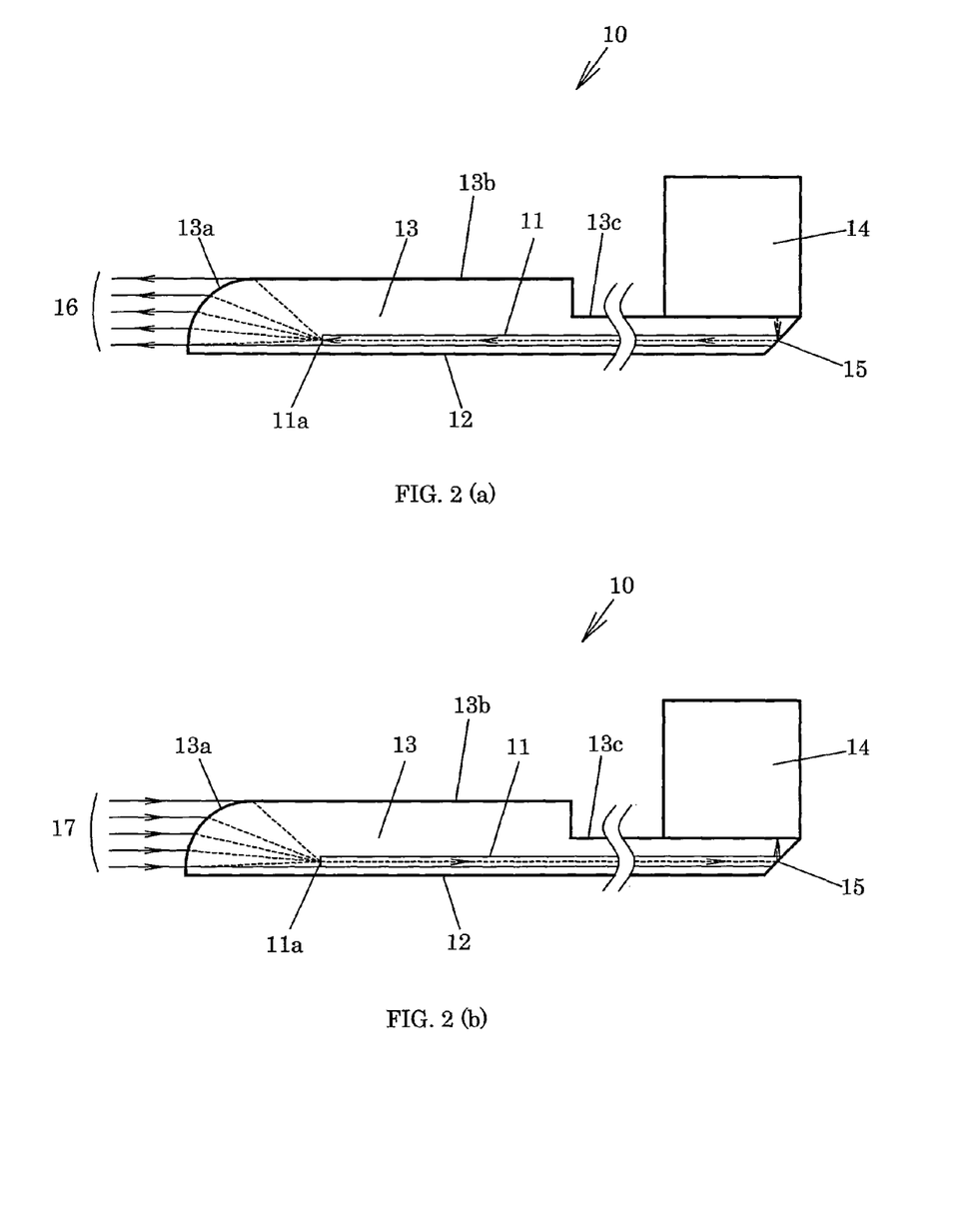

FIG. 2 (a) is a schematic view of the optical waveguide 10 with photoelectric conversion element according to the present invention when used as a light emitting-side optical waveguide. In this case, a light emitting element which converts electrical signals into optical signals is used as the photoelectric conversion element 14. Light (indicated by a dotted line) emitted from the photoelectric conversion element 14 passes through the thin portion 13c of the over-cladding layer 13, enters the cores 11 vertically, undergoes total reflection by the total reflecting mirrors 15, propagates through the cores 11, emerges from the ends 11a of the cores 11, and enters the over-cladding layer 13. The diverging light emerging from the ends 11a of the cores 11 is collimated by the convex lens portion 13a of the over-cladding layer 13 and outputted as parallel light 16.

FIG. 2 (b) is a schematic view of the optical waveguide 10 with photoelectric conversion element according to the present invention when used as a light receiving-side optical waveguide. In this case, a light receiving element which converts optical signals into electrical signals is used as the photoelectric conversion element 14. Wide parallel light 17 received by the surface of the convex lens portion 13a of the optical waveguide 10 with photoelectric conversion element is concentrated by the convex lens portion 13a onto the ends 11a of the cores 11 in the over-cladding layer 13, enters the cores 11, and propagates through the cores 11. The light (indicated by a dotted line) propagating through the cores 11 undergoes total reflection by the total reflecting mirrors 15, travels toward the photoelectric conversion element 14, enters the photoelectric conversion element 14, and is then converted into electrical signals.

Figure 3:
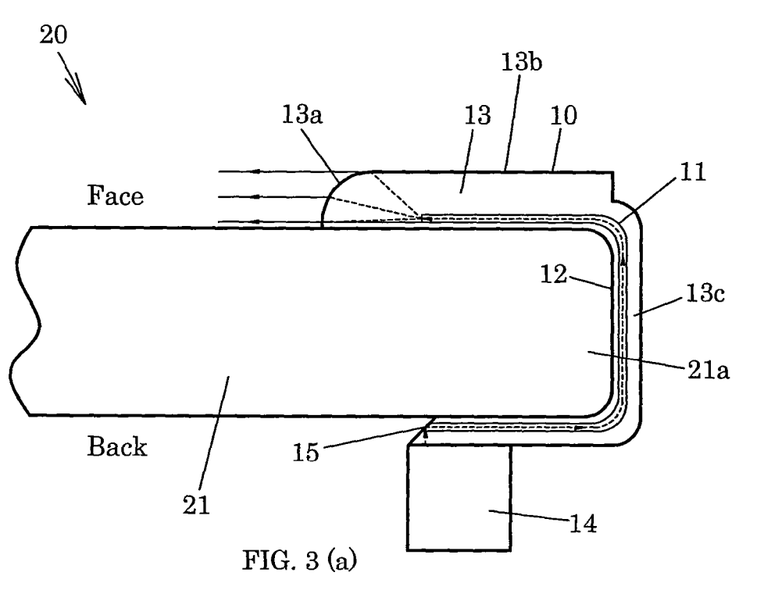

The optical waveguide 10 with photoelectric conversion element according to the present invention is suitable for use in optical touch panels. FIG. 3 (a) is a schematic view of the optical waveguide 10 with photoelectric conversion element according to the present invention when used as a light emitting-side optical waveguide in an optical touch panel 20. FIG. 3 (b) is a schematic view of the optical waveguide 10 with photoelectric conversion element according to the present invention when used as a light receiving-side optical waveguide in the optical touch panel 20.

The thin portion 13c of the over-cladding layer 13 of the optical waveguide 10 with photoelectric conversion element according to the present invention is bendable in such a direction that the under-cladding layer 12 faces inward. This makes it possible, as shown in FIGS. 3 (a) and 3 (b), to fold the optical waveguide 10 with photoelectric conversion element according to the present invention around an end portion 21a of a display panel 21 of the optical touch panel 20 from the face side toward the back side of the display panel 21. At this time, the cores 11 are bent at the right angle twice. However, there is no problem in propagating light as long as the cores 11 have an appropriate curvature as shown in FIGS. 3 (a) and 3 (b).

In the case of the optical touch panel 20 shown in FIG. 3 (a), the convex lens portion 13a of the over-cladding layer 13 through which light is emitted to the outside is arranged on the face side of the display panel 21, but the photoelectric conversion element 14 and its associated circuit (not shown) are arranged on the back side of the display panel 21.

In the case of the optical touch panel 20 shown in FIG. 3 (b), the convex lens portion 13a of the over-cladding layer 13 through which light enters from the outside is arranged on the face side of the display panel 21, but the photoelectric conversion element 14 and its associated circuit (not shown) are arranged on the back side of the display panel 21.

In either case, the photoelectric conversion element 14 and its associated circuit larger in size than the over-cladding layer 13 can be arranged on the back side of the display panel 21. This makes it possible to reduce the size of a frame portion of the optical touch panel 20 and the difference in level on the surface of the frame portion and its vicinity.

<Cores>

The cores 11 to be used in the present invention are formed from any material having a higher refractive index than the under-cladding layer 12 and the over-cladding layer 13 and high transparency at the wavelength of light propagating through the cores 11. A material forming the cores 11 is preferably a UV curable resin having excellent patterning properties. Preferred examples of such a UV curable resin include UV curable acrylic resins, UV curable epoxy resins, UV curable siloxane resins, UV curable norbornene resins, and UV curable polyimide resins.

The cross-sectional shape of each of the cores 11 perpendicular to the direction of light propagation is not particularly limited, but is preferably trapezoidal or rectangular from the viewpoint of patterning properties. The width of the base of the cross-section of each of the cores 11 perpendicular to the direction of light propagation (core width) is preferably in the range of 30 to 500 μm. The height t3 (see FIG. 1) of the cross-section of each of the cores 11 perpendicular to the direction of light propagation (core height) is preferably in the range of 30 to 100 μm.

<Under-Cladding Layer>

The under-cladding layer 12 to be used in the present invention is formed from any material having lower refractive index than the core 11. A material forming the under-cladding layer 12 is not particularly limited, but is preferably a UV curable epoxy resin from the viewpoint of bendability and formability.

The maximum difference in refractive index between the core 11 and the under-cladding layer 12 is preferably 0.01 or more, more preferably 0.02 to 0.2. This makes it possible to allow light to propagate through the core 11 with low loss.

The refractive index of the UV curable resin can be appropriately increased or decreased by introducing an organic group selected into the UV curable resin or changing the organic group content of the UV curable resin. The refractive index of the UV curable resin can be increased by, for example, introducing a cyclic aromatic group (e.g., a phenyl group) into a resin molecule or increasing a cyclic aromatic group content per resin molecule. On the other hand, the refractive index of the UV curable resin can be decreased by, for example, introducing a linear or cyclic aliphatic group (e.g., a methyl group or a norbornene group) into a resin molecule or increasing a linear or cyclic aliphatic group content per resin molecule.

The thickness t4 (see FIG. 1) of the under-cladding layer 12 is preferably in the range of 10 to 50 μm.

<Over-Cladding Layer>

The over-cladding layer 13 to be used in the present invention includes at least two portions different in thickness, that is, at least the thick portion 13b and the thin portion 13c. A material forming the over-cladding layer 13 is preferably the same as that forming the under-cladding layer 12.

The thickness t2 (see FIG. 1) of the thin portion 13c of the over-cladding layer 13 is preferably in the range of 10 to 160 μm. The thickness t5 (see FIG. 1) of the thick portion 13b of the over-cladding layer 13 is preferably in the range of 300 to 1,500 μm. The difference t6 (see FIG. 1) between the thickness t5 (see FIG. 1) of the thick portion 13b and the thickness t2 (see FIG. 1) of the thin portion 13c of the over-cladding layer 13 is preferably in the range of 140 to 1490 μm.

The thin portion 13c of the over-cladding layer 13 has low rigidity, and therefore the optical waveguide 10 with photoelectric conversion element is bendable in a region including the thin portion 13c. Further, the thickness t2 (see FIG. 1) of the thin portion 13c of the over-cladding layer 13 interposed between the cores 11 and the photoelectric conversion element 14 is small, and therefore light passing through the thin portion 13c of the over-cladding layer 13 is less likely to scatter and attenuate. This makes it possible to enhance the efficiency of optical coupling between the cores 11 and the photoelectric conversion element 14.

The thin portion 13c of the over-cladding layer 13 may be formed by cutting the over-cladding layer 13 or may be directly formed by molding using a mold having an internal shape corresponding to the external shape of the over-cladding layer 13 including the thick portion 13b and the thin portion 13c. In the latter case, the over-cladding layer 13 including the thick portion 13b and the thin portion 13c can be obtained by, for example, pouring a liquid resin into a predetermined mold and solidifying or curing the resin.

<Photoelectric Conversion Element>

The photoelectric conversion element to be used in the present invention is a light emitting element which converts electrical signals into optical signals or a light receiving element which converts optical signals into electrical signals.

The light emitting element is not particularly limited as long as it can generate light beams that pass through a light emitting-side optical waveguide and then cross a coordinate input region of an optical touch panel. The light emitting element preferably emits light having a wavelength in the near-infrared range (700 nm to 2,500 nm). Examples of such a light emitting element include light emitting diodes and semiconductor lasers.

The light receiving element detects the intensity of light received by a light receiving-side optical waveguide. The light receiving element preferably detects light having a wavelength in the near-infrared range (700 nm to 2,500 nm). Examples of such a light receiving element include CMOS image sensors and CCD image sensors.

<Optical Touch Panel>

Figure 4:
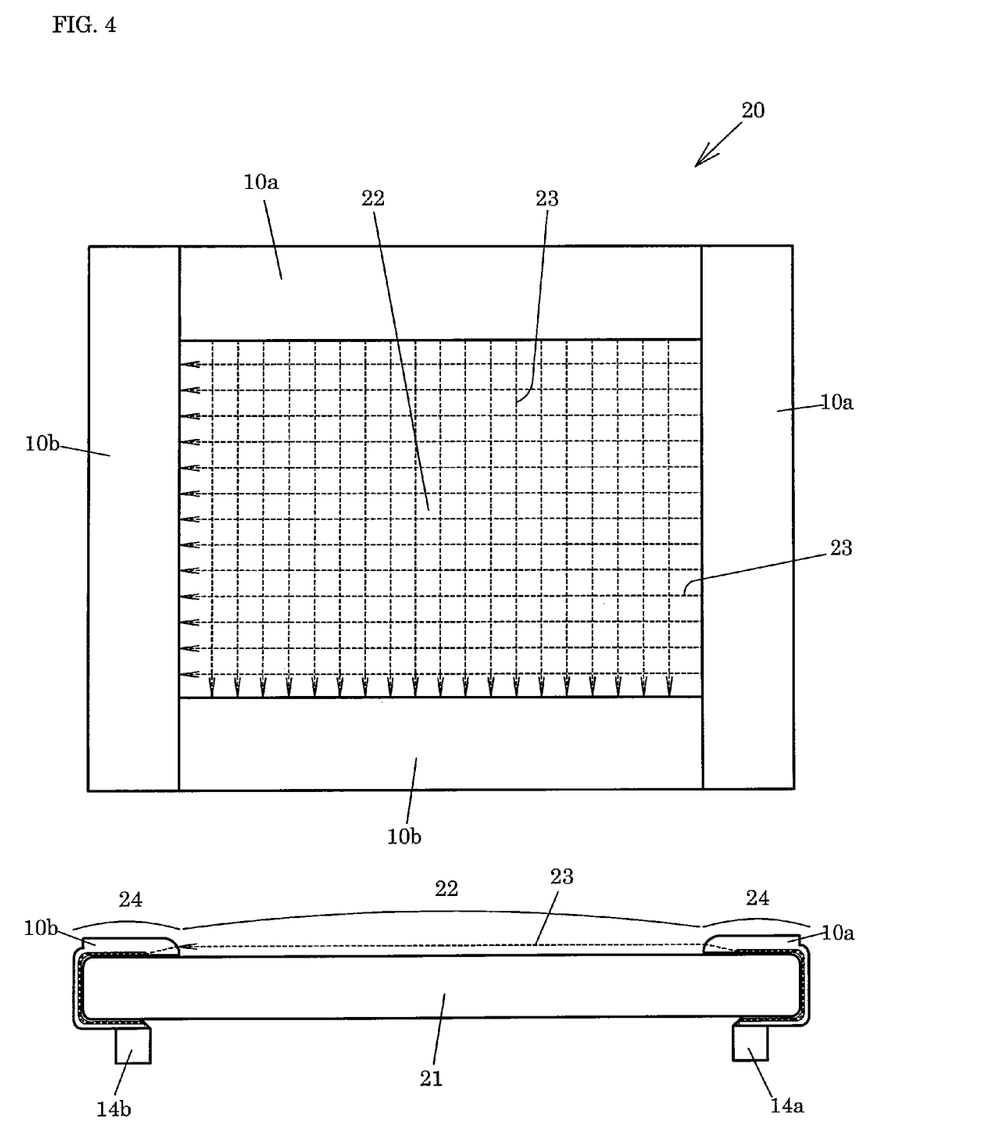
FIG. 4 is a schematic view of an optical touch panel according to the present invention.

As shown in FIG. 4, the optical touch panel 20 according to the present invention includes the display panel 21, a coordinate input region 22 provided on the surface of a display panel 21, a light emitting-side optical waveguide 10a with photoelectric conversion element which generates light 23 crossing the coordinate input region 22, and a light receiving-side optical waveguide 10b with photoelectric conversion element which receives the light 23 which has crossed the coordinate input region 22.

The optical waveguides 10a and 10b with photoelectric conversion element include a light emitting-side photoelectric conversion element 14a and a light receiving-side photoelectric conversion element 14b, respectively. In the optical touch panel 20 according to the present invention, the light emitting-side photoelectric conversion element 14a and the light receiving-side photoelectric conversion element 14b are arranged on the back side of the display panel 21. This makes it possible to reduce the size of a frame portion 24 surrounding the coordinate input region 22 of the optical touch panel 20 and the difference in level on the surface of the frame portion 24 and its vicinity.

The coordinate input region 22 refers to a region where the light 23 generated by the light emitting-side optical waveguide 10a with photoelectric conversion element crosses. The coordinate input region 22 is typified by a display screen of the display panel 21, such as a liquid crystal display panel or a plasma display panel. The coordinate input region 22 is preferably rectangular because it is easy to accurately adjust the position of the cores 11. An open space may be provided in front of the surface (i.e., the surface facing an operator) of the coordinate input region 22. Alternatively, a glass panel or an acrylic panel may be provided on the surface of the coordinate input region 22 to improve wear resistance.

EXAMPLES

<Preparation of Varnish for Forming Cladding Layer>

A varnish for forming cladding layer was prepared by mixing the following components:

Component A: UV-curable epoxy-based resin having an alicyclic skeleton (EP 4080E manufactured by ADEKA CORPORATION) 100 parts by weight; and Component B: photo acid generator (CPI-200K manufactured by San-Apro Ltd.) 2 parts by weight <Preparation of Varnish for Forming Cores>

A varnish for forming cores was prepared by mixing the following components:

Component C: UV-curable epoxy-based resin having a fluorene skeleton (OGSOL EG manufactured by Osaka Gas Chemicals Co., Ltd.) 40 parts by weight;

Component D: UV-curable epoxy-based resin having a fluorene skeleton (EX-1040 manufactured by Nagase ChemteX Corporation) 30 parts by weight;

Component E: 1,3,3-tris(4-(2-(3-oxetanyl))butoxyphenyl) butane 30 parts by weight (which was synthesized by the method described in Example 2 of JP 2007-070320 A);

Component B 1 part by weight; and

Ethyl lactate 41 parts by weight

<Formation of Optical Waveguide>

The varnish for forming cladding layer was applied onto the surface of a polyethylene naphthalate film having a thickness of 188 μm, irradiated with UV light at 1,000 mJ/cm$^2$, and thermally-treated at 80° C. for 5 minutes to form an under-cladding layer 12 having a thickness t4 of 20 μm. The refractive index of the under-cladding layer 12 as measured at a wavelength of 830 nm was 1.510.

Then, the varnish for forming cores was applied onto the surface of the under-cladding layer 12 and thermally-treated at 100° C. for 5 minutes to form a core layer. The core layer was then covered with a photo mask, irradiated with UV light at 2,500 mJ/cm$^2$, and thermally-treated at 100° C. for 10 minutes. Then, a plurality of cores 11 each having a width of 20 μm and a height t3 of 50 μm were formed by dissolving away an unexposed portion of the core layer using an aqueous γ-butyrolactone solution. The refractive index of each of the cores 11 as measured at a wavelength of 830 nm was 1.592.

A quartz mold having an internal shape corresponding to the external shape of the over-cladding layer 13 shown in FIG.

1 including the thick portion 13b and the thin portion 13c was prepared. The above-described cores were covered with the quartz mold, and then the varnish for forming cladding layer was poured into the quartz mold, irradiated with UV light at 2,000 mJ/cm², and thermally-treated at 80° C. for 5 minutes. Then, the quartz mold was removed. In this way, an optical waveguide shown in FIG. 1 having an over-cladding layer 13 including a thick portion 13b and a thin portion 13c was formed. Then, the end of the thin portion 13c including the cores 11 was cut by a dicing blade at an angle of 45° with respect to the main surface of the thin portion 13c to form the total reflecting mirror 15 (45-degree mirror) at the end of each of the cores 11.

The thus formed optical waveguide was bendable in a region including the thin portion 13c of the over-cladding layer 13 in such a direction that the under-cladding layer 12 faces inward.

The total thickness t1 of the under-cladding layer 12, the core 11, and the thin portion 13c of the over-cladding layer 13 was 100 μm. The thickness t2 of the thin portion 13c of the over-cladding layer 13 was 30 μm. The thickness t5 of the thick portion 13b of the over-cladding layer 13 was 1,000 μm.

<Production of Optical Touch Panel>

The thus produced four optical waveguides were prepared and assembled into a frame-shaped optical waveguide. Then, the frame-shaped optical waveguide was fixed to a display panel so as to surround a coordinate input region of the display panel. The ends of cores of each of the two adjacent light emitting-side optical waveguides were optically coupled via a UV curable adhesive to a light emitting element emitting infrared light having a wavelength of 850 nm. The light emitting element was a VCSEL manufactured by OPTOWELL Co., Ltd.

The ends of cores of each of the other two adjacent light receiving-side optical waveguides were optically coupled via a UV curable adhesive to a light receiving element. The light receiving element was a CMOS linear sensor array manufactured by TAOS Inc.

In this way, an optical touch panel was produced. When the intensity of light emitted from the light emitting element was defined as 100%, the intensity of light detected by the light receiving element in a state where light beams crossing the coordinate input region were not intercepted was 10% of that of light emitted from the light emitting element. The optical touch panel could accurately determine the coordinates of position of a finger intercepting light beams crossing the coordinate input region thereof. This indicates that the optical touch panel can perform its intended function.

<Method for Measuring Refractive Index>

The varnish for forming cladding layer was applied onto a silicon wafer by spin coating to form a film of the varnish, and the film was used as a sample for measuring the refractive index of a cladding layer. The varnish for forming cores was applied onto another silicon wafer by spin coating to form a film of the varnish, and the film was used as a sample for measuring the refractive index of a core. Measurement of refractive index was performed using a prism coupler (SPA-400 manufactured by Sairon Technology, Inc.).

<Method for Measuring Core Width and Core Height>

The optical waveguide produced in Example was cut widthwise by a dicer-type cutter (DAD 522 manufactured by DISCO), and the cutting surface of the optical waveguide was observed by a laser microscope (manufactured by Keyence Corporation) to measure the width and height of each of the cores.

INDUSTRIAL APPLICABILITY

The optical touch panel according to the present invention is suitable for use in, for example, ATMs, ticket bending machines, FA systems, copying machines, POS terminals, and arcade video game machines.

This application claims priority from Japanese Patent Application No. 2009-094499, which is incorporated herein by reference.

There have thus been shown and described a novel optical waveguide with photoelectric conversion element and a novel optical touch panel which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An optical waveguide with photoelectric conversion element comprising:
   an optical waveguide including a plurality of cores through which light propagates, an under-cladding layer supporting the cores, and an over-cladding layer embedding the cores; and
   a photoelectric conversion element optically coupled to the optical waveguide, wherein the over-cladding layer includes a thick portion and a thin portion, each of the cores includes a total reflecting mirror provided at its end, the optical waveguide is bendable in a region including the thin portion in such a direction that the under-cladding layer faces inward, and the photoelectric conversion element is arranged on the thin portion so as to be optically coupled to the cores via the total reflecting mirrors.

2. The optical waveguide with photoelectric conversion element according to claim 1, wherein the optical waveguide has a thickness of 50 to 200 μm in a region including the thin portion.

3. The optical waveguide with photoelectric conversion element according to claim 1 or 2, wherein the under-cladding layer and the over-cladding layer are formed from a UV curable epoxy-based resin.

4. The optical waveguide with photoelectric conversion element according to claim 3, wherein the over-cladding layer further includes a convex lens portion whose cross-sectional shape is substantially a quarter of a circle as a light emitting portion or a light receiving portion.

5. The optical waveguide with photoelectric conversion element according to claim 4, wherein the core has a higher refractive index than the under-cladding layer and the over-cladding layer, and wherein a difference in refractive index between the core and the under-cladding layer and between the core and the over-cladding layer is 0.02 to 0.2.

6. An optical touch panel equipped with the optical waveguide with photoelectric conversion element according to claim 5, wherein the photoelectric conversion element is arranged on the back side of the display panel.

7. An optical touch panel equipped with the optical waveguide with photoelectric conversion element according to claim 4, wherein the photoelectric conversion element is arranged on the back side of the display panel.

8. The optical waveguide with photoelectric conversion element according to claim 3, wherein the core has a higher refractive index than the under-cladding layer and the over-cladding layer, and wherein a difference in refractive index between the core and the under-cladding layer and between the core and the over-cladding layer is 0.02 to 0.2.

9. An optical touch panel equipped with the optical waveguide with photoelectric conversion element according to claim 8, wherein the photoelectric conversion element is arranged on the back side of the display panel.

10. An optical touch panel equipped with the optical waveguide with photoelectric conversion element according to claim 3, wherein the photoelectric conversion element is arranged on the back side of the display panel.

11. The optical waveguide with photoelectric conversion element—according to claim 1 or 2, wherein the over-cladding layer further includes a convex lens portion whose cross-sectional shape is substantially a quarter of a circle as a light emitting portion or a light receiving portion.

12. The optical waveguide with photoelectric conversion element according to claim 11, wherein the core has a higher refractive index than the under-cladding layer and the over-cladding layer, and wherein a difference in refractive index between the core and the under-cladding layer and between the core and the over-cladding layer is 0.02 to 0.2.

13. An optical touch panel equipped with the optical waveguide with photoelectric conversion element according to claim 12, wherein the photoelectric conversion element is arranged on the back side of the display panel.

14. An optical touch panel equipped with the optical waveguide with photoelectric conversion element according to claim 11, wherein the photoelectric conversion element is arranged on the back side of the display panel.

15. The optical waveguide with photoelectric conversion element according to claim 1 or 2, wherein the core has a higher refractive index than the under-cladding layer and the over-cladding layer, and wherein a difference in refractive index between the core and the under-cladding layer and between the core and the over-cladding layer is 0.02 to 0.2.

16. An optical touch panel equipped with the optical waveguide with photoelectric conversion element according to claim 15, wherein the photoelectric conversion element is arranged on the back side of the display panel.

17. An optical touch panel equipped with the optical waveguide with photoelectric conversion element according to claim 1 or claim 2, wherein the photoelectric conversion element is arranged on the back side of the display panel.

\* \* \* \* \*